No. 710,402. Patented Oct. 7, 1902.
F. T. BAKER.
FOLDING REEL FOR HARVESTING MACHINES.
(Application filed May 13, 1902.)
(No Model.)

Witnesses:
Jas. E. Hutchinson
E. Keiser

Inventor.
Fulton T. Baker,
by Swift and Co., Atty's.

UNITED STATES PATENT OFFICE.

FULTON T. BAKER, OF ANDREWS, INDIANA.

FOLDING REEL FOR HARVESTING-MACHINES.

SPECIFICATION forming part of Letters Patent No. 710,402, dated October 7, 1902.

Application filed May 13, 1902. Serial No. 107,086. (No model.)

*To all whom it may concern:*

Be it known that I, FULTON T. BAKER, a citizen of the United States, residing at Andrews, in the county of Huntington and State of Indiana, have invented a new and useful Folding Reel for Harvesting-Machines; and I do hereby declare the following to be a full, clear, and exact description of the invention, such as will enable others skilled in the art to which it appertains to make and use the same.

The invention relates to folding reels for harvesting-machines; and it has for its object to provide a simple, inexpensive, and efficient reel of great strength and durability adapted to be readily attached to any harvesting-machine with a single bolt and capable of being quickly and compactly folded by the removal of a single bolt when it is desired to move the machine from one field to another or when it is desired to store the reel away.

A further object of the invention is to provide a reel of this character which will be firmly braced and rigidly held in operative position and which may be folded without taking it apart.

The invention consists in the novel construction and arrangement of parts hereinafter described and shown, and particularly pointed out in the claims hereto appended.

Figure 1:
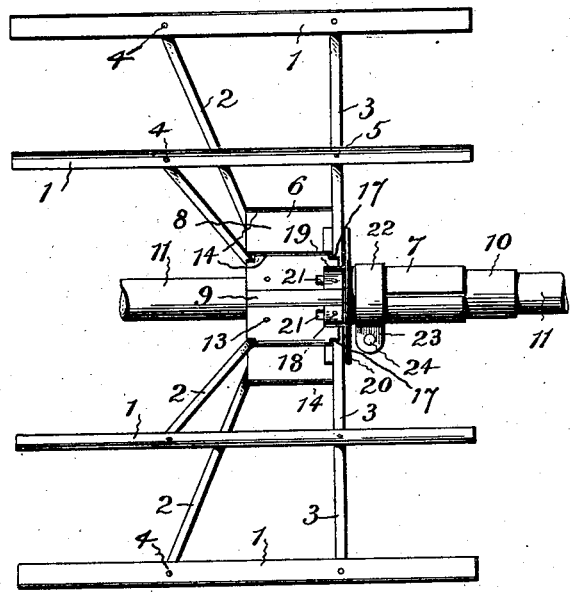
Figure 2:
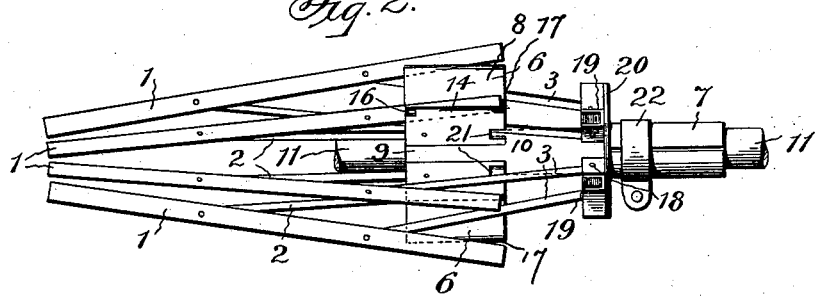
Figure 3:
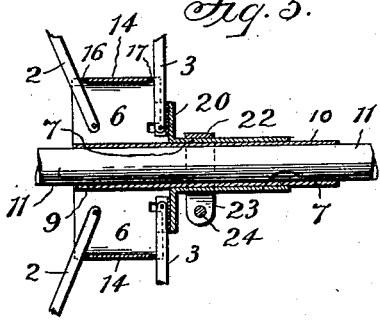
Figure 4:
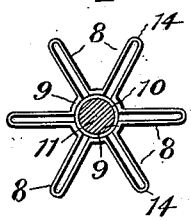
Figure 5:
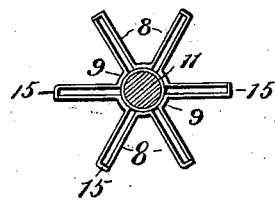

In the drawings forming part of this specification, and in which like numerals of reference designate corresponding parts, Figure 1 is an elevation of a reel constructed in accordance with this invention and shown in inoperative position. Fig. 2 is a similar view, the reel being folded. Fig. 3 is a longitudinal sectional view, the parts being arranged as shown in Fig. 1. Fig. 4 is a detail view of the head. Fig. 5 is a similar view of the head in a modified form, showing the arrangement of the radial flanges.

Referring to the drawings, 1 designates a series of blades which are supported by folding arms 2 and 3, pivoted at their outer ends by rivets 4 and 5 or other suitable fastening devices to the blades and similarly connected at their inner ends to a head 6 and to a slidable sleeve 7, whereby the blades and the arms are adapted to fold from the position illustrated in Fig. 1 of the drawings to that shown in Fig. 2.

The reel is preferably constructed of sheet-steel; but any other suitable material may be employed, if desired, and when constructed of sheet-steel the blades and the arms will consist of strips of sheet-steel folded longitudinally, as illustrated in the drawings, and this construction will provide a stiff reel of great strength and durability and at the same time will render the reel exceedingly light and will render the same exceedingly easy to be operated.

The head 6, which may be constructed of a single casting, is preferably formed of a single piece of sheet metal bent to form hollow radial wings 8 and curved connecting portions 9, which are riveted or otherwise secured to one end of a sleeve 10, which is designed to be secured to a shaft 11 of a machine, and the said wings are composed of parallel sides and connecting outer portions, and they receive the inner portions of the arms 2, which are pivoted between the sides by rivets 13 or other suitable fastening devices. The outer connecting portions 14 may be omitted, or rather the sides and the curved portions may be constructed of separate pieces or sections, as illustrated in Fig. 5 of the drawings, and one of the sides of each section will then be provided at its outer end with a projecting flange 15, arranged approximately at right angles and extending across the space between such sides and the adjacent side of the next section. The arm 2 when the parts are arranged as shown in Fig. 1 is received within notch or recess 16 of the connecting portion 14, which is also provided at the other end of the wing with a notch or recess 17 for the reception of the opposite arm 3. The inner end of the arm 3 is pivoted by a rivet 18 or other suitable fastening device between a pair of radial flanges 19 of an annular flange or collar 20 of the slidable sleeve, the said annular flange or collar being arranged at the inner end of the slidable sleeve 7 and being provided at its inner face with radial flanges 19, arranged in pairs. The radial flanges of each pair are preferably constructed of a single piece of sheet metal, which is bent into an approximately U shape, the transverse portion or bend thereof being secured to the annular flange or disk 20. The radial flanges of the flange or disk 20 are of greater width than the hollow wings and are adapted to receive the same to lock the parts in the position shown in Fig. 1, and when the parts are arranged in such position the inner portions of the arms 3 are received between the projecting sides of the hollow wings. The inner portions of the sides of the hollow wings are provided with notches or recesses 21 to receive the pivots of the inner end of the arms 3. The parts are thereby firmly interlocked to form a rigid structure, and they are secured in such position by a clamp 22, consisting of a band encircling the slidable sleeve and having outturned perforated ends 23, which are connected by a bolt 24. The slidable sleeve is split longitudinally to render it expansible and to enable it to be clamped tightly on the sleeve 10 of the head, and when it is desired to fold the reel the bolt of the clamp is loosened and the slidable sleeve is drawn outward to the position shown in Fig. 2 and is rotated slightly to permit the arms 3 to clear the wings or flanges in folding.

The reel is adapted to be quickly folded without separating the parts, and it may be instantly arranged in operative position, and it is only necessary to remove a single bolt for this purpose. The reel folds compactly to enable the machine to be conveniently removed from one field to another, and when the reel is folded it may be easily covered with canvas or other material to protect it.

What I claim is—

1. A folding reel comprising a head provided with wings, blades, folding arms 2 and 3 pivoted at their outer ends to the blades, the inner ends of the arms 2 being pivoted to the head, a slidable sleeve having the arms 3 pivoted to it and capable of movement to and from the head to interlock the arms with the wings and to permit the arms and the blades to fold, and means for securing the slidable sleeve for holding the arms in engagement with the wings, substantially as described.

2. A folding reel comprising a head having hollow wings, blades, arms 2 pivoted in the hollow wings and similarly connected to the blades, arms 3 pivoted at their outer ends to the blades, and a slidable sleeve connected with the inner ends of the arms 3 and capable of movement to and from the head to carry the arms 3 into and out of the wings, substantially as and for the purpose described.

3. A folding reel comprising a head provided with hollow wings, blades, arms 2 pivoted at their outer ends to the blades and having their inner ends pivoted within the wings at one end of the head, a slidable sleeve provided with radial flanges and capable of movement to and from the head, and the arms 3 pivoted at their outer ends to the blades and having their inner ends pivoted between the said radial flanges and adapted to be carried into and out of the hollow wings by the sliding movement of the sleeve, substantially as described.

4. A folding reel comprising a head having hollow wings open at the ends of the head, a slidable sleeve capable of a slight rotary movement, and folding arms pivoted at their outer ends to the blades and having their inner ends pivoted respectively in the hollow wings and to the slidable sleeve, the arms pivoted to the slidable sleeve being adapted to be carried into and out of the wings by the sliding movement of the sleeve and being carried laterally out of the plane of the wings by the rotary movement of the sleeve to permit the parts to fold, substantially as described.

5. A folding reel comprising a head, composed of hollow wings having sides and outer connecting portions, and curved portions connecting the inner ends of the sides, a sleeve fixed to the head, an expansible sleeve slidably mounted on the fixed sleeve, blades, arms pivoted to the blades at their outer ends and similarly connected at their inner ends to the head and to the slidable sleeve and adapted to interlock with the wings, and a clamp for securing the expansible sleeve to the fixed sleeve, substantially as described.

6. A folding reel comprising a head having hollow wings provided at one end of the head with outer notches 16 and having inner and outer notches 17 and 21 at the other end of the head, a slidable sleeve provided with an annular flange and having radial flanges arranged in pairs at the inner face thereof, blades, arms 2 pivoted at their outer ends to the blades and at their inner ends to the wings and adapted to be received in the notches 16, and arms 3 pivoted to the blades and between the radial flanges and adapted to be carried into the adjacent ends of the wings, the latter fitting within the radial flanges and the inner pivots of the arms 3 being received within the inner notches 21, substantially as described.

In testimony whereof I have hereto affixed my signature in the presence of two witnesses.

FULTON T. BAKER.

Witnesses:
CHARLES A. FAVORITE,
CLAUDE CLINE.